United States Patent [19]
Marshall

[11] 3,948,051
[45] Apr. 6, 1976

[54] FLUID PRESSURE AMPLIFIER
[76] Inventor: Don J. Marshall, Box 410, Rte. 6, Edgewater, Md. 21037
[22] Filed: Aug. 1, 1974
[21] Appl. No.: 493,702

[52] U.S. Cl. .................... 60/542; 60/547; 173/116
[51] Int. Cl.² .......................................... F15B 7/02
[58] Field of Search ............ 60/537, 542, 543, 544, 60/569–572; 157/1, 11

[56] References Cited
UNITED STATES PATENTS

| 847,945 | 3/1907 | Ileh | 60/537 |
|---|---|---|---|
| 1,024,395 | 4/1912 | Canty | 60/542 |
| 2,396,897 | 3/1946 | Stelzer | 60/537 |
| 3,250,335 | 5/1966 | Joelson | 60/537 |
| 3,292,370 | 12/1966 | Foster et al. | 60/544 |
| 3,306,042 | 2/1967 | Crooks | 60/537 |
| 3,601,987 | 8/1971 | Chermensky | 60/537 |
| 3,601,988 | 8/1971 | Chermensky | 60/537 |
| 3,762,160 | 10/1973 | Kramer | 60/537 |

Primary Examiner—Martin P. Schwadron
Assistant Examiner—H. Burks, Sr.
Attorney, Agent, or Firm—William J. Dick

[57] ABSTRACT

A fluid pressure amplifier for intensifying fluid pressure, the amplifier comprising a housing including a gas-hydraulic interface piston; a first chamber includes a slave piston mounted for reciprocation therein and for abutting engagement with a work piece. A hydraulic fluid path extends intermediate the interface piston and the first chamber so as to apply hydraulic pressure thereto. A second chamber is disposed in the path intermediate the first chamber and the interface piston and includes a check valve in the path intermediate the second chamber and the first chamber. A third chamber, includes a fluid intensifier piston having a head end and a tail end, the head end being mounted for reciprocation in the third chamber and the tail end being mounted for reciprocation in the second chamber. The head end of the intensifier piston has a larger diameter than the tail end and is exposed to gas pressure while the tail end is exposed, in the second chamber, to hydraulic pressure. A gas inlet communicates with the head end and simultaneously the interface piston, the intensifier piston thereby being movable from a first position to a second position by gas pressure on its head end to increase hydraulic pressure in the first chamber. Relief means are provided to effect a decrease of gas pressure upon the head end of the fluid intensifier piston when it reaches the second position so that the piston moves from the second back to the first position for a repeat of the cycle.

The purpose of this abstract is to enable the Public and the Patent Office to determine rapidly the subject matter of the technical disclosure of the application. This abstract is neither intended to define the invention of the application nor is it intended to be limiting as to the scope thereof.

39 Claims, 15 Drawing Figures

3,948,051

FLUID PRESSURE AMPLIFIER

SUMMARY OF THE INVENTION AND STATEMENT OF THE PRIOR ART

The present invention relates to a fluid pressure amplifier and more particularly relates to a fluid pressure amplifier for automatically intensifying fluid pressure to accomplish work.

Hydraulic rams may be divided into two classes, one in the general field of an actuator, and the second the field of a high pressure ram. Most applications of the hydraulic ram require a relatively short working stroke although in many instances the ram must travel some considerable distance before actual contact with the work is accomplished. The hydraulic rams of the second class are useful for such applications as general metal working applications, as for example embossing, riveting, coining, blanking, piercing, etc. which, as is easily seen, require a short working stroke. In certain instances there are applications for hydraulic rams which must traverse a considerable distance with the resistance against the hydraulic member gradually increasing, or increasing very rapidly and then suddenly decreasing. For example, hydraulic power actuated rams are useful in power operated tire removing tools such as illustrated in U.S. Pat. No. 2,728,383 issued on Dec. 27, 1955 to the present inventor, and U.S. Pat. No. 2,844,194 issued on July 22, 1958 to the present inventor. Another such application of an air actuated hydraulic ram is illustrated in U.S. Pat. No. 3,006,404 issued on Oct. 31, 1961 to the present inventor, and in U.S. Pat. No. 3,002,548 issued on Oct. 31, 1961.

Additionally, most air-hydraulic rams having intensifiers therein for increasing the hydraulic work available have one finite maximum pressure available at the work piston or rod. For example, in the patent to Palmer, U.S. Pat. No. 3,266,415 issued on Aug. 16, 1966 a hydraulic ram includes a compressed air operated intensifier in which the pressure of the ram is increased to the full work pressure after the ram contacts the work piece. However, after full working pressure is reached, very little motion of the major work rod or tool (ram) is posssible except for a building up of the force in a single intensifying stroke.

In view of the above, it is a principal object of the present invention to provide a fluid pressure amplifier for intensifying hydraulic or fluid pressure.

Another object of the present invention is to provide an improved construction fluid pressure amplifier which will permit an initial long work stroke under reduced pressure until the work piece is contacted and thereafter which permits automatically increasing the pressure on the ram to a sufficient extent to permit full movement of the ram, the pressure on the ram being automatically raised to the desired level to effect working movement of the piston.

Yet another object of the present invention is to provide a novel fluid pressure amplifier which may be light weight in construction so that it may be utilized as a tool for removing tires such as shown in the above-mentioned patents and, in conjunction with the adapter for portable power operated tire removing tools such as illustrated in Applicant's co-pending patent application Ser. No. 293,313 filed on Sept. 29, 1972, now U.S. Pat. No. 3,841,380.

Still another object of the present invention is to provide a fluid pressure amplifier in the form of an air-hydraulic ram which may effectively be utilizied for such uses as in conventional for hydraulic rams as both an actuator and for short working stroke rams used for piercing, coining, riveting, clamping, embossing, etc.

Other objects and a complete understanding of the invention may be had by referring to the following specification and claims taken in conjunction with accompanying drawings in which:

Figure 1:
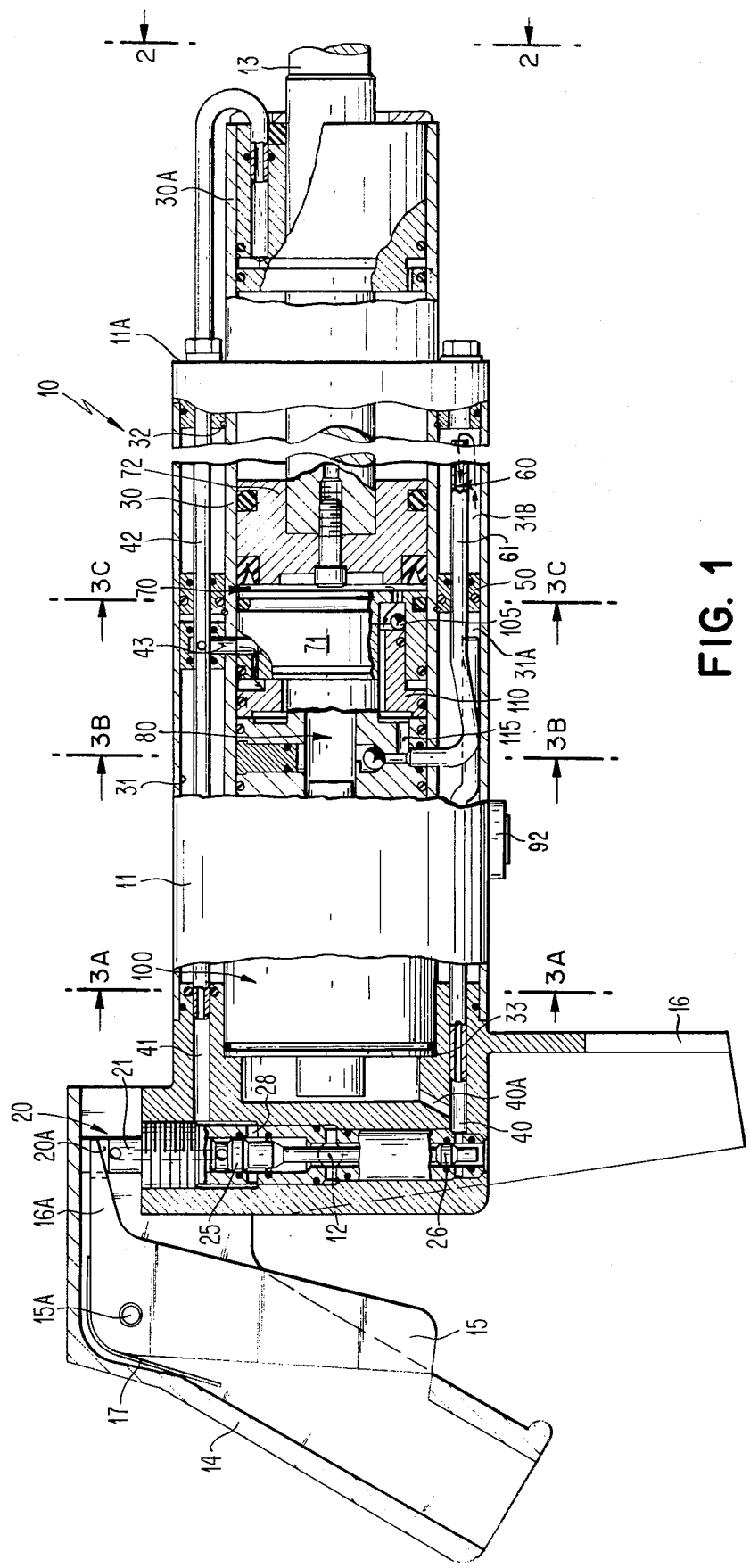
FIG. 1 is a fragmentary sectional schematic view in side elevation of a portable pressure amplifier constructed in accordance with the present invention.

Referring now to the drawings, especially FIG. 1 thereof, a fluid pressure amplifier 10 for intensifying fluid pressure is illustrated therein. As shown, the amplifier generally comprises a cylindrical housing or casing 11 having a fluid, in the present instance an air inlet connection 12 (FIG. 2) at one end thereof and a reciprocating working shaft 13 at the opposite end therefrom. In the illustrated instance the housing includes a hand grip or the like 14 to make the tool portable, and includes a trigger 15 for actuating a valve assembly 20 to permit air to flow into the housing to cause the output shaft to move outwardly axially of the housing to come into contact with a work piece, or to move axially inwardly of the housing into a retracted position depending upon the position of the valve assembly 20.

Figure 2:
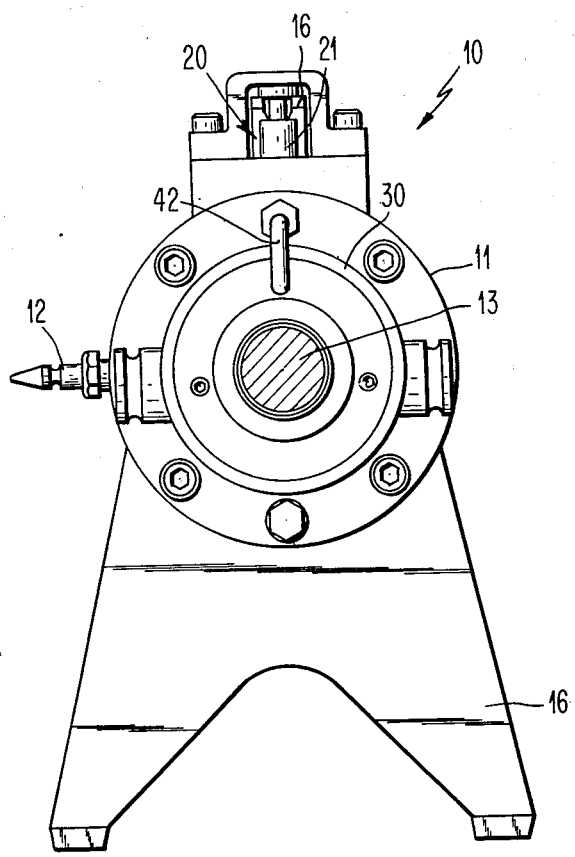
FIG. 2 is an end elevational view taken along line 2—2 of FIG. 1.

In accordance with the invention the fluid pressure amplifier operates to amplify fluid pressure from the air inlet connection 12 and multiply the pressure automatically as applied to the output shaft 13 so as to automatically arrive at the necessary outlet pressure to accomplish work on a work piece. To this end, and referring first to FIGS. 1–3, the housing 11 includes an inner barrel 30 which is rigidly connected to the housing leaving an annular passage 31 interiorly of the housing intermediate the barrel and the interior of the housing. As illustrated best in FIG. 1, the barrel 30 is captured in the housing 11 at opposite ends thereof as at 32 and 33, the barrel projecting as at 30A beyond the terminal end 11A of the housing. To permit resting the amplifier on a surface and to prevent rolling of the same the housing includes a stand 16 which depends from the housing 11 (FIG. 1 and 2).

GENERAL DESCRIPTION OF THE AMPLIFIER

Due to the complexity of the pressure amplifier of the present invention, a brief description of a manner in which the amplifier operates to provide a high pressure work output at the shaft 13 follows.

The valve assembly 20 serves to couple and uncouple line air pressure (approximately 160 PSI available in the normal factory or garage) to one of two air inlets 40 and 41, air entering air inlet 40 causing the output shaft to extend axially of the housing 11 while air coupled to the second inlet 41 effects retraction of the output shaft 13. Air entering the air inlet 40 is coupled into an annular space 31A and thereby comes into contact with a reciprocable gas-hydraulic inteface piston 50 which divides the annular space 31 into the space 31A and 31B, the space 31B providing a fluid reservoir for the tool. Hydraulic fluid in the reservoir 31B, upon movement of the interface postion 50 causes hydraulic pressure to be applied through a fluid path 60 into a first chamber 70 interiorly of the barrel 30, the first chamber 70 being intermediate a cylinder head 71 and a slave piston 72 which is coupled to the output shaft 13. Intermediate the first chamber and the fluid path 60 is a second chamber 80, there being check means 82. in the cylinder head 71 to peprmit fluid flow from the second chamber to the first chamber but not vice versa. Thus as may be seen, with reference to FIG. 1, as the gas-hydraulic interface piston moves to the right, fluid pressure generally equal to line air pressure will be applied to the slave piston 722 causing rightward (reference FIG. 1) movement of the output shaft 13. As the output shaft 13 connects or abuts a work piece, pressure builds up in the first chamber until it is approximately equal to air line pressure and at that point fluid hydraulic pressure intensification occurs. Air entering the air inlet 40 enters into a third chamber 90 (FIG. 4A) by way of a branch 40A of the air inlet 40 and there contacts a fluid intensifier piston 100, the rear face of the head end 100A of which is in communication with the atmosphere as through a nipple or the like 92. The intensifier piston 100 has a tail end 101 (FIG. 4A) which is mounted for reciprocation in the second chamber, and as illustrated the head end 100A of the piston has a larger diameter than the tail end. A pressure buildup in the third chamber effects movement of the intensifier piston 100 to the right building up hydraulic pressure in the second chamber and therefore in the first chamber causing further pressure buildup on the output shaft 13. At a predetermined point, pressure is released on the fluid intensifier piston head end and the check means intermediate the first and second chambers 70 and 80 respectively prevents fluid backflow from the first chamber to the second chamber while permitting the fluid intensifier piston 100 to move to the left for further reciprocatory movement. Thus the fluid intensifier piston reciprocates in the third chamber building up pressure and causing further movement of the output shaft 13 until the work desired is accomplished.

Upon the valve assembly being moved to the second positon, air enters into a second inlet 41 (FIG. 1) exposing through the fluid path or in the present instance line 42 air into and against the forward side of the slave postion 72 causing the slave piston to move to the left (reference FIG. 1) and the output shaft 13 to be retracted. As air pressure moves the slave piston to the left, the check means intermediate the first and second chamber is operative to prevent fluid flow from the first chamber to the second chamber and thus an addititonal check means including check balls 105 are unseated from a position closing off communication from the reservoir 31B to the first chamber. Additionally, a tap off from the conduit 42 as by air inlet aperture 43, pushes a hat piston 110 rearwardly, i.e. to the left allowing fluid flow or hydraulic flow to move back through a bypass path 115 into the fluid reservoir 31B. The pressure against the gas-hydraulic interface piston causes leftward movement of that piston effecting a refill of the reservoir 31B. Because of the structure of valve asssembly 20 air captured in the annular space 31A is permitted to escape to atmosphere.

DETAILED DESCRIPTION

Air Connection and Inlet Valve Assembly

Although the inlet valve assembly and operation thereof may take any convenient form, the valve assembly illustrated in FIG. 1 with its associated trigger mechanism is particularly adapted for the portable tool illustrated. To this end, and referring first to FIG. 1, the trigger 15 is pivoted as at 15A in the handle, the trigger including a tang 16 which is captured in a slto 20A in the upper part of a valve spool 21. The trigger, as illustrated, is biased as by a leaf spring 17 which, when the trigger is not depressed, serves to hold the spool 21 in the elevated position 26 illustrated in FIG. 1. As illustrated best in FIGS. 1, 2, 4A and 4B, the spool 21 includes a sleeve-like insert 22 having a bore 23 therein for receiving the spool 21, the bore being stepped as at 23A for purposes which will become evident hereinafter. Suitable O-ring type seals 24A, 24B, 24C and 24D are provided interiorly of the sleeve 22 to provide a fluid seal when mating with first and second enlarged valve portions 25 and 26 respectively of the spool. As shown best in FIGS. 4A and 4B, the upper end 27 of the spool 21 also has an enlarged portion equal in diameter to the portion 25.

The operation of the spool, to permit air entry for a working stroke of the output shaft 13 may best be seen in FIG 4A wherein air entering the inlet 12 is prevented from passing upwardly of the spool in the bore 23A and 23 because of the first enlarged valve portion 25 and the seal 25B, but is permitted to pass into the air inlet 40 because the second enlarged valve portion 26 of the spool is below the opening through the sleeve 22 but is effectively sealed by the O-ring 24D. As may be visualized, as the output shaft moves to the right (reference FIG. 1) air on the head end of the slave piston 72 will pass through the piping 42 connected to the second air inlet 41 through an inlet passage 28 in the sleeve 22 into the recessed portion 25A of the spool 21. A drilled conduit 29 which extends from the recessed portion 25A to an outlet 29, communicates with the atmosphere, thus relieving and exposing the head end of the slave piston 72 to atmospheric pressure and thereby preventing any pressure buildup against the slave piston 72.

Alternatively, when the trigger 15 is released, the spring 17 causes the tang 16 of the trigger 15 to move counterclockwise about the pivot 15A elevating the spool 21 and moving the spool 21 upwardly until the air inlet 12 is in communication with the second air inlet 41 (see FIG. 1). In this manner air may move through the second air inlet 41, piping 42 and contact the slave piston 72 forcing the piston to the left, while simultaneously permitting air to enter through the conduit 43 (FIG. 1 and 4) into contact with the cap pistion 110 to relieve hydraulic pressure in the first chamber 70.

Air Hydraulic Interaction

Prior to pressure intensification for amplification of hydraulic force against the slave piston 72, it is necessary and desirable that the output shaft move the distance necessary to bring it into contact with the work piece upon which it is to operate. For example, in patent application Ser. No. 293,313, filed by the present Applicant on Sept. 29, 1972, and now U.S. Pat. No. 3,841,380, the fluid pressure amplifier of the present invention may be employed as the power unit, in which instance a wedge is attached to the output shaft 13 (the wedge being used to break the bead between the tire and its rim). In the instance of using the fluid pressure amplifier as a power unit, it is necesssary that the output shaft travel a sufficient distance to contact the tire under the rim, and thereafter pressure intensification occur which causes bead separation from the rim to effect such tire removal.

Figure 3A:
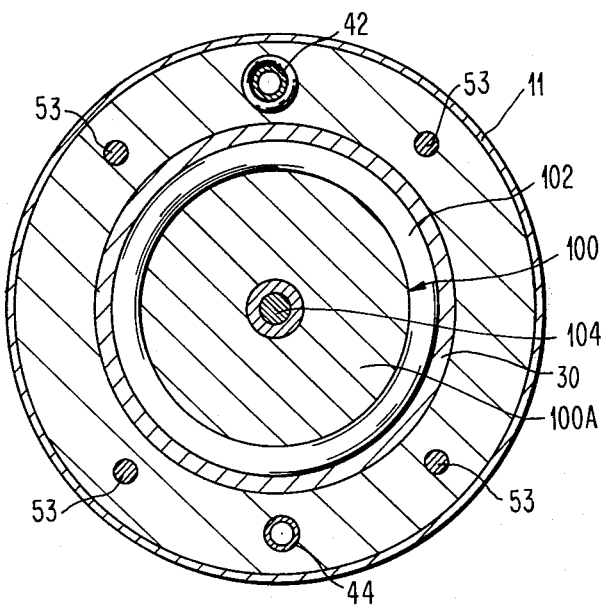
FIG. 3A – FIG. 3C are sectional views taken respectively along lines 3A—3A, 3B—3B, and 3C—3C.
Figure 3B:
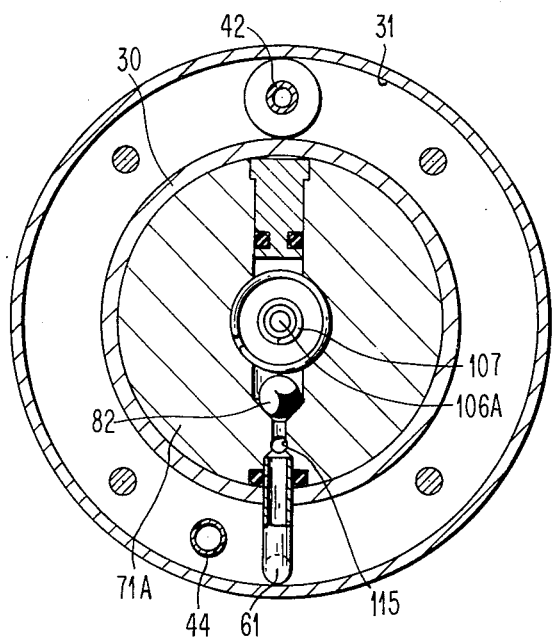
Figure 3C:
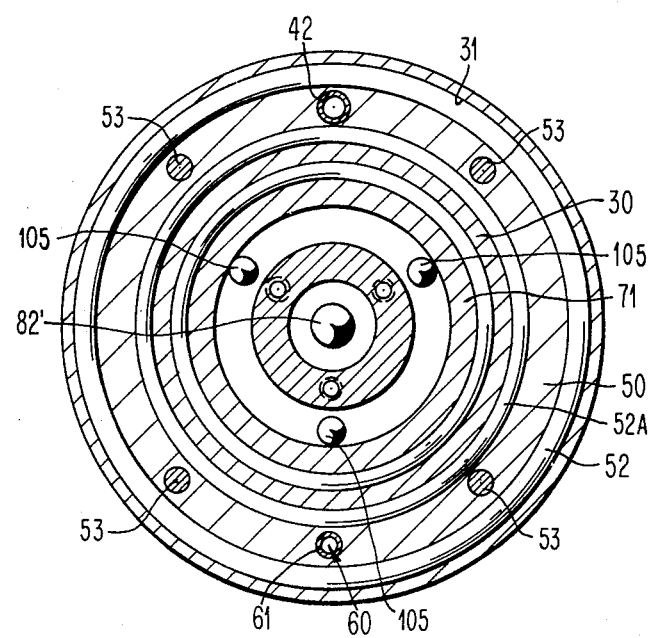

Thus the apparatus of the present invention operates in a dual mode, the first mode of operation effects a movement of the output shaft for coming into contact with the work piece, and in the second mode movement occurs under high pressure to effect the necessary work to accomplish the result desired. To this end, air enters the first air inlet 40 (reference FIG. 4A) and enters into a conduit 44 which terminates in the annular space 31A as at a terminal end 44A in the annular space 31. The chamber formed by the annular space 31A is variable in as much as the annular space 31 is divided by the gas-hydraulic interface piston 50. The gas interface piston 50 is in the form of an annulus and utilizes hydraulic tubing 61 (forming part of the fluid path 60) and the conduit or tubing 42 associated with the air return and slave piston return, as axial guides for the air interface piston. Of course, additional guides 53 or suppports may be employed for the same puspose, as shown in FIGS. 3A, 3B and 3C. In the illustrated instance, the air interface piston 50 is in the form of a double labyrinth seal, having inner and outer seals 51, 51A and 52, 52A respectively which seal against the respective tubes and the internal side walls of the housing 31 and the exterior of the barrel 30. Air pressing against or pressurizing the gas-hydraulic interface piston 50 effects movement thereof, with reference to FIG. 4, in a rightward direction, pressurizing hydraulic fluid in the fluid reservoir 31B, causing the fluid to enter the hydaulic piping 61 which forms part of the fluid path. As shown, and in the present instance, the hydraulic pipe enters back through the interface piston 50 and enters into an extension 71A of the cylinder head 71, the extension being fixed within the barrel 30. The hydraulic piping 61 branches into a second chamber inlet conduit 81 and a cap piston hydraulic inlet conduit 115. In the second chamber inlet conduit 81 is mounted a check valve 82 which permits communication between fluid in the reservoir 31A and the second chamber 80, but does not permit fluid flow between the second chamber and the hydraulic piping 61. As hydraulic pressure builds up within the hydraulic piping, the hat piston 110 closes off check valves 105 (FIGS. 3C and 4) and prevents fluid communication between the first chamber 70 and the conduit 115.

In order to provide fluid communication between the second chamber and the first chamber, a stepped bore 81' is provided. To this end and as best illustrated in FIG. 4A, check means, in the present instance a ball check 82' is captured in the enlarged portion 81A of the bore 81' and restrained from movement into the first chamber 70 by an apertured insert 83. As may be seen from the position of the check ball, fluid may flow from the second chamber 80 to the first chamber 70 by way of the bore 81' but the reverse flow condition is inhibited by the ball 82' seating in the interface or seat portion 84 intermediate the enlarged portion 81A and the reduced diameter inlet portion 85 of the bore. Fluid pressure buildup in the first chamber 70 causes the slave piston 72, which is mounted for reciprocation within the barrel 30, to move to the right (reference FIG. 4A) until the output shaft 13 contacts a work piece upon which work is to be accomplished. When fluid pressure against the slave piston 72 reaches a condition where the gas or air pressure against the gas-hydraulic interface piston 50 is such as to overcome system seal friction, intensification of the fluid hydraulic pressure against the slave piston commences.

Amplification Circuit

Upon system pressures reaching sufficient levels, normally after the work element contacts the work piece and meeting resistance, fluid pressure intensification occurs. To this end, and referring first to FIG. 4A, attached to the barrel and to the housing 11 is a disk or the like 91 which defines and divides the bore of the barrel into a fourth chamber 45 and the third chamber 90. A stepped air passageway 92 provides a path of air or gas communication between the fourth chamber 45 and the third chamber 90. The stepped passageway has an enlarged opening 92A, an inwardly sloped portion 92B which merges into a reduced diametrical portion 92C. Mounted in the bore or passageway 92 is a ball check 46 which is biased out of the bore as by a biasing spring 47 which tends to keep the bore or passageway 92 clear to permit air entry and communication between the fourth chamber 45 and the third chamber 90. Spring 47 is not able, unaided, to force the ball 46 to a free flow position, but its force, augmented by increased pressure in the third chamber is capable of so doing. It is thus effective as a governor, increasing fluid flow as resistance (work load) increases and diminishing flow under low load conditions, preventing destructive overspeeds.

As previously described, the third chamber 90 houses the fluid intensifier piston 100 which includes a head end 100A and a tail end 101, the tail end being mounted for reciprocation in the second chamber 80. As shown, the head end 100A is of a greater diameter than the diameter of the tail end. In this manner, reciprocation of the piston in the third chamber effects an intensification of the pressure in the second chamber and thus the first chamber 70 corresponding to the ratio of the diameters.

In one of the preferred embodiments of the present invention, the head end 100A of the fluid intensifier piston 100 includes a seal 102 which is nested in a circumferentially extending recess 103 in the head end 100A. Extending through the housing and projecting into the third chamber on the low pressure side of the intensifier piston 100 is an outlet nipple 92 which is in communication, as by a passageway 93, with the atmosphere, so that when the piston 100 moves to the right, air entrapped between the cylinder head extension 71A and the head end 100A of the piston 100, will be exhausted to the atmosphere. As shown, the entry 86 through the cylinder head extension 71A into the second chamber 80 is provided with suitable seals 87 and 88 respectively to permit reciprocating motion of the tail end 101 while preventing escape of hydraulic fluid from the second chamber 80 into and out the nipple 92. As may be appreciated, upon the fluid intensifier piston moving to the right (reference FIG. 4A) check valve means 82 will close because pressure within the chamber 80 is increased relative to the pressure in the reservoir 31B. However, check valve 82' is forced open and fluid pressure increases in the first chamber 70 simultaneously with the increase in the pressure in the second chamber 80.

The intensifier piston is movable between a first position and a second position, the first position being when the intensifier piston is to the far left, and the second position when it is to the far right (reference FIG. 4A) and that particular cycle of pressure intensification is completed. At that point it is necessary to relieve air pressure on the intensifier piston 100 so that residual pressure in the second chamber 80 as well as reservoir pressure may move the intensifier pistion to the left or from the second to the first position for a renewed cycle and pressure.intensification of the fluid pressure in the first and second chambers. To this end, and in the illustrated instance, the intensifier piston 100 includes a shaft 104 which is mounted for axial reciprocation in a bore 104A in the piston. The shaft 104, as shown, projects, in the illustrated instance, from both ends of the piston as at the tail end 106A and the head end 106B. A biasing spring 107 extends about the tail end 106A and is utilized, as will become more clear hereinafter to accelerate relative leftward motion of the shaft 104 within the intensifier piston, thus rapidly opening a valve means 94, as seen in FIG. 4B. As shown, the tail end 101 of the intensifier piston is provided with a recess 107A which is adapted to receive a stop collar 108 circumscribing the tail end 106A of the shaft 104. As the intensifier piston 100 reaches its second position, the tail end 106A of the shaft strikes the cylinder head 71 and moves the shaft 104 to the left in its bore 104A after energizing the spring 107.

The position of the shaft 104 after the tail end 106A strikes the cylinder head 71 is illustrated in FIG. 4B. The effect of the leftward movement of the shaft 104 is to unseat or break away the valve means, in the illustrated instance a flexible seal 94 from the frontal surface 99 of the head end 100A of the fluid intensifier piston 100. The seal 94, once unseated, and driven fully open by spring 107 provides gaseous or fluid communication between the third chamber 90 and the conduit 93 in the nipple 92 allowing air under pressure to move through passageways 98 located in the head end 100A of the intensifier piston 100. This permits a release of pressure in the third chamber 90 and causes the check ball 46 to move into a flow restrictive position inhibiting, but restrictor preferably not entirely cutting off air flow across the check valve from the fourth chamber 45 to the third chamber 90. Thus the check valve 46 in conjunction with its seat 92B permits air leakage thereby even in the closed position preventing "jamming" of the ball 46. Simultaneously therewith, check ball 82, due to the drop in pressure in the second chamber 80 becomes unseated and hydraulic fluid flows into the second chamber 80 from the reservoir driving the fluid intensifier piston from its second position to its first position. Of course, inasmuch as pressure in the first chamber is greater than pressure in the second chamber 80, the check ball 82' moves into its seated position against its seat 84 cutting off fluid flow from the first chamber 70 into the second chamber 80. Upon the fluid intensifier piston 100 reaching approximately its first position, the projecting end 106B of the shaft 104 enters into the passageway 92C of the bore 92 and unseats the check ball 46 permitting air to once again flow from the fourth chamber 45 into the third chamber 90.

In order to reseat the flexible seal 94, so as to permit another cycle of operation of the fluid intensifier piston, the fixed disk 91 is preferably provided with a recess 97 which acting as a pressure cylinder, cooperates with a plate or pistion 96 developing force to reposition the shaft 104 and thus effect a seal of the flexible valve member 94 against the surface 99 of the head end 100A of the fluid intensifier piston 100. Thereafter the cycle repeats builiding up pressure in the third chamber 90 and effecting further movement of the slave pistion 72 and thus rightward movement of the shaft 13.

This cycle of operation of the intensifier piston will continue until one of two things occurs: (1) that the trigger is released and gas or air pressure is no longer applied to the inlet 40 or (2) that the limit of pressurization is reached as fixed by conventional mathematical principles based on fluid seal friction, maximum amplification due to ratio of diameters of the fluid intensifier piston, becoming equal to the work demand, resulting in stall.

Alternate Embodiments

It should be recognized that any convenient alternate means may be employed for relieving the gas pressusre (air) upon the head end of the fluid intensifier piston when the fluid intensifier piston reaches the second position. Two such alternate embodiments are illustrated in FIGS. 5 and 6.

The embodiment illustrated in FIGS. 5A – 5D is somewhat more economical in construction and employs means for aiding the reciprocation of the intensifier piston from the second position to the first position by relieving hydraulic pressure in the second chamber as a means to release hydraulic work load at the critical instant when the air exhaust means becomes equal to air input, which would otherwise result in a "stall" condition. To this end, and referring first to FIG. 5A, a barrel 130 is shown connected to an extension 171A of a cylinder head (not shown), there being a inlet path 160 and inlet check valve 182 connected to a second chamber 180, which check valve permits fluid entry into the second chamber 180 and then past a check ball 182' into the first chamber (not shown) and contact with the slave piston (not shown).

In the illustrated instance the fluid intensifier piston 200 comprises a duplex head end 200A and a tail end 201, the head end 200A being mounted for reciprocation in a third chamber 190 and the tail end 201 being mounted for reciprocation in a third chamber 190 and the tail end 201 being mounted for reciprocation in the second chamber 180. As illustrated, the duplex head end 200A includes a floating head portion 202 which is free for limited axial reciprocation as by a pin 203 captured by a snap ring or the like 204 in a bore 205 in the intensifier piston 200. The pin 203 has an enlarged end portion 203A which limits its forward movement to the position shown in FIG. 5A. The floating head portion 202 of the intensifier piston 200 has diameter that is less than the diameter of the chamber 190, and includes an inwardly beveled forward portion 191 adjacent the gas inlet port 192 and its associated check ball 146. As illustrated, the floating head portion 202 includes a circumferentially extending axially projecting periphery 206 which includes a frusto-conical outer wall portion 207, the projection 206 extending into a circumferentially extending recess 208 in the rigid portion 209 of the head end 200A. Captured in the recess 208 intermediate the rigid portion 209 of the head end 200A and the frusto-conical wall 207 of the floating head portion 202, is an annular seal 210, for example an O-ring which is radially expansible, for purposes which will become more clear hereinafter. Projecting from the floating portin 202 of the head end 200A is a projection 206A which is aligned with the bore 192 and serves the same purpose as the projection 106B in FIGS. 4A and 4B heretofore described.

Figure 4A:
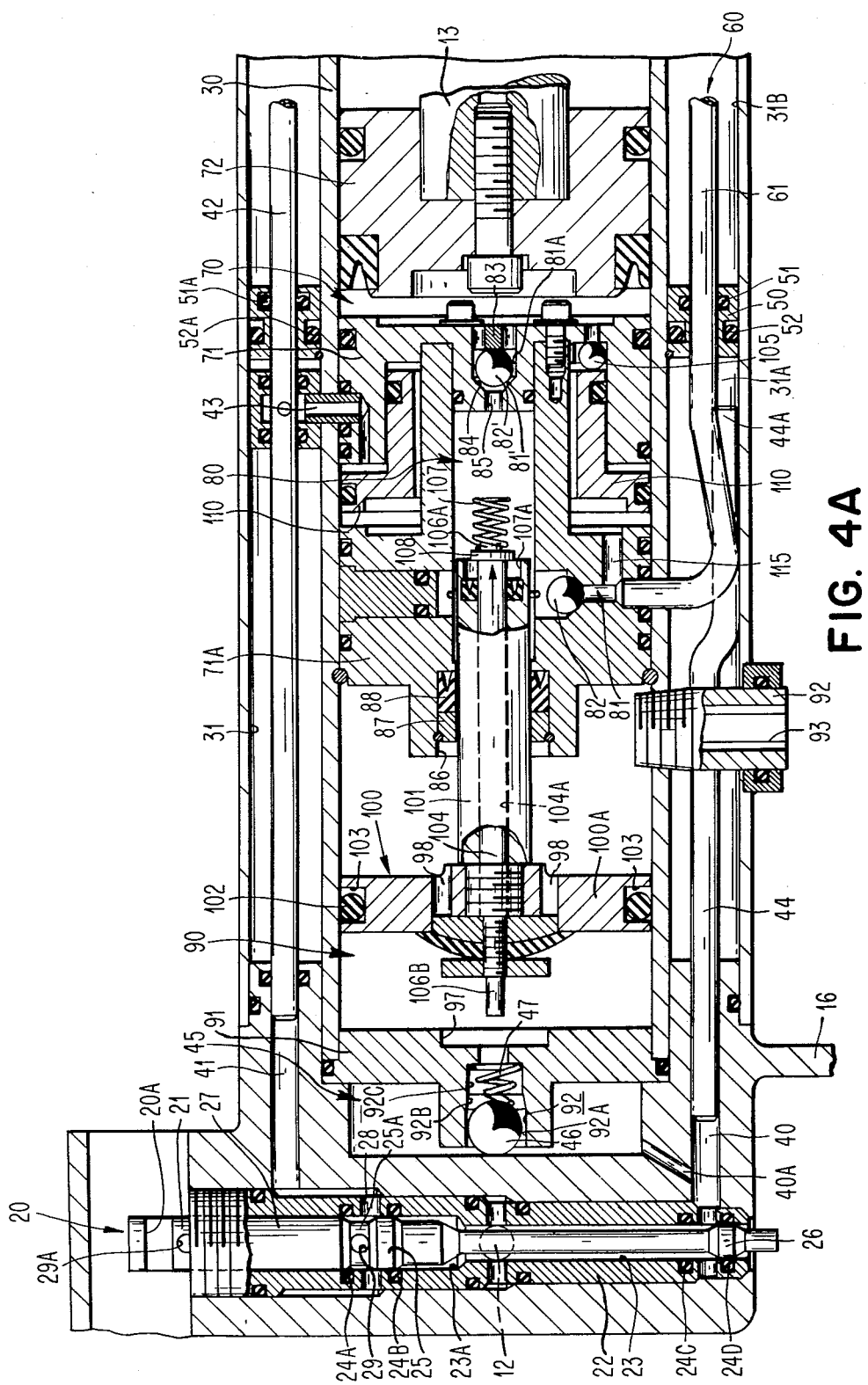
FIG. 4A is an enlarged fragmentary sectional view of a portion of the apparatus illustrated in FIG. 1 and illustrating certain of the mechanism therein in one position.
Figure 4B:
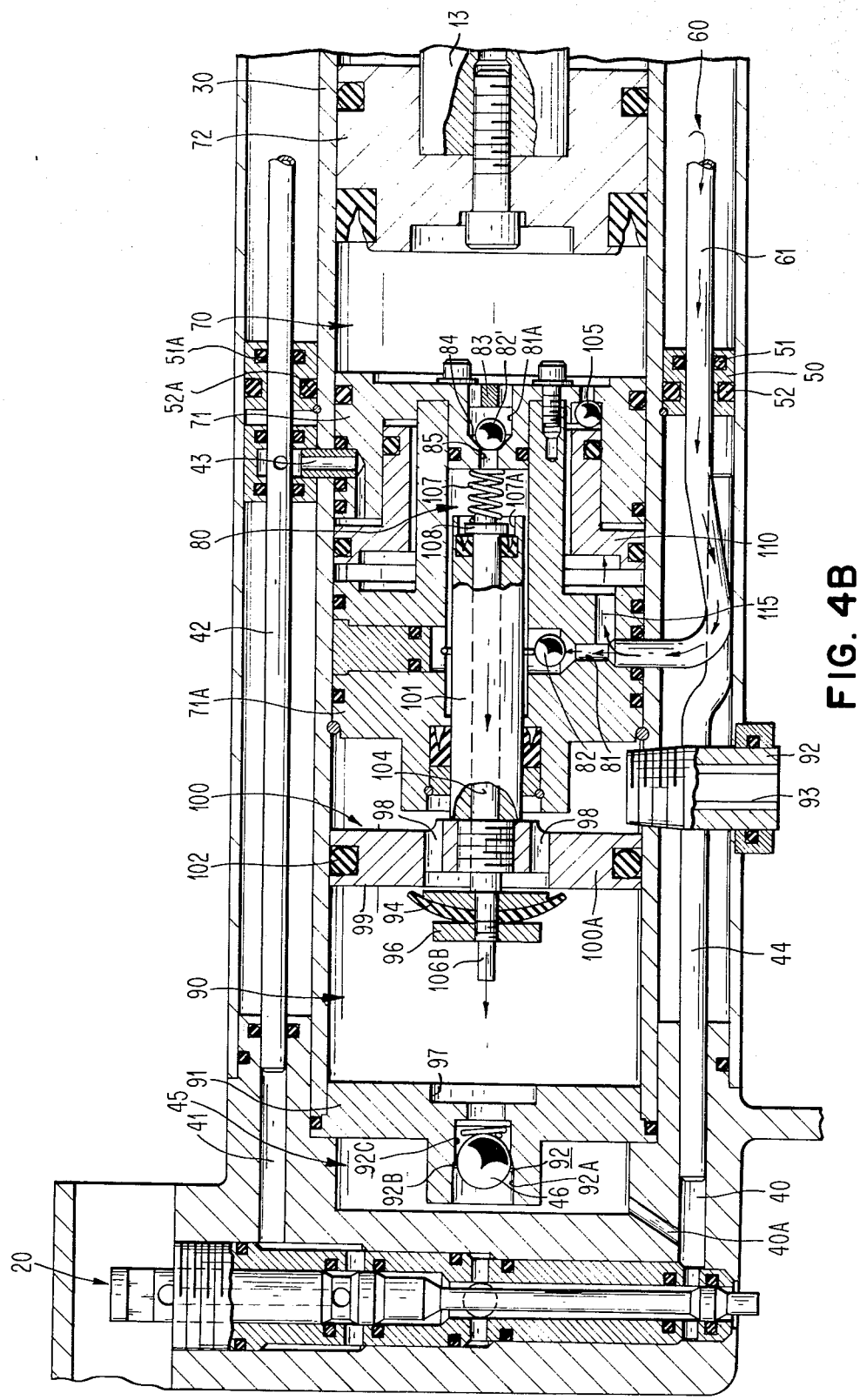
FIG. 4B is an enlarged fragmentary sectional view of the apparatus illustrated in FIG. 4A but showing said apparatus in another position.
Figure 5A:
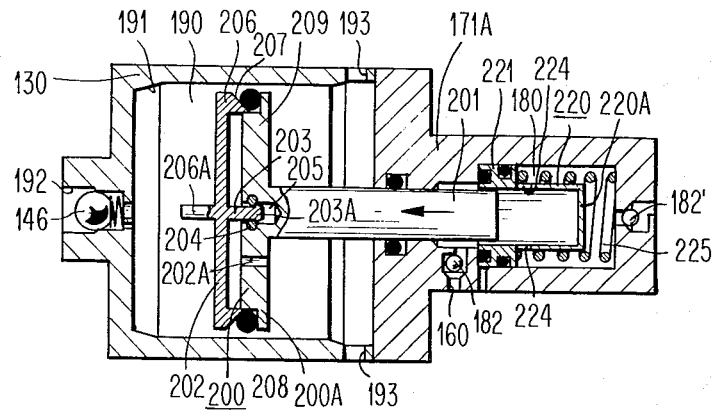
FIG. 5A – 5D are schematic fragmentary sectional views taken in side elevation of another embodiment of the present invention, and illustrating portions of that aparatus in serially varying positions.
Figure 5B:
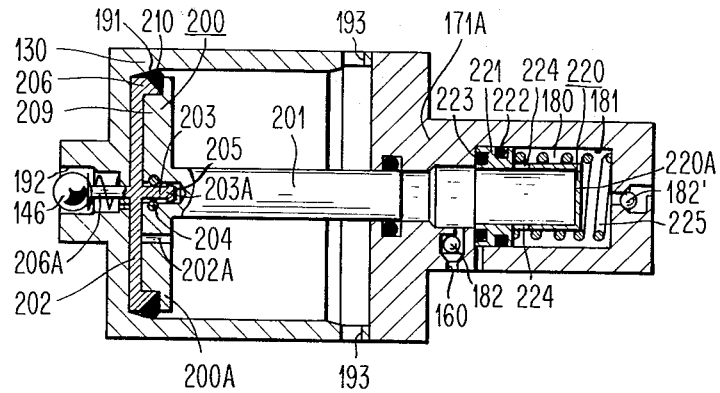
Figure 5C:
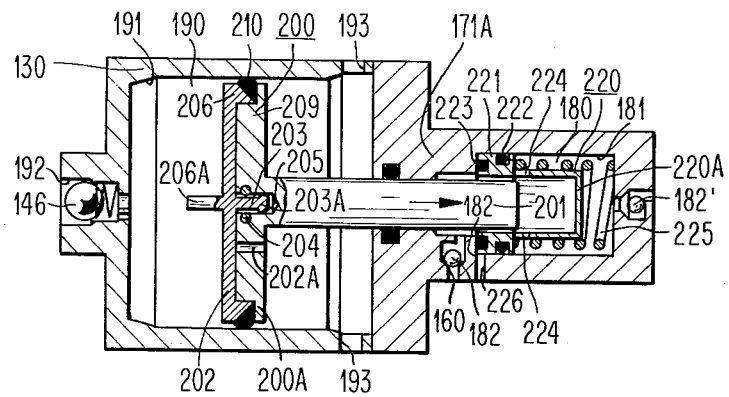
Figure 5D:
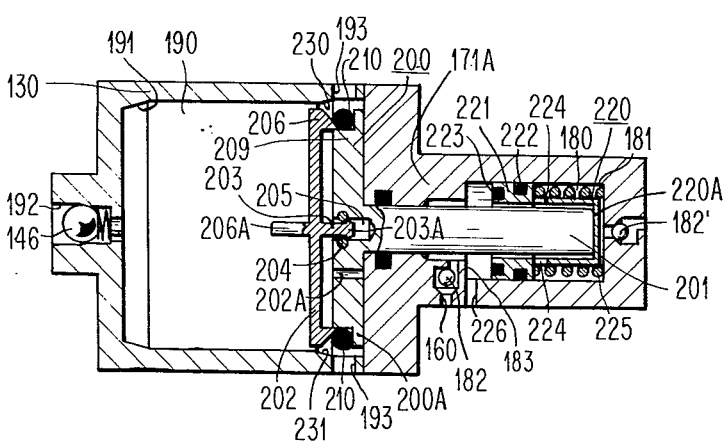

Assuming that the intensifier piston 200 is moving to the left as shown by the arrow in FIG. 5A, the floataing head portion 202 of the head end 200A is in the position illustrated in FIG. 5A permitting communication of the chamber 190 to the atmosphere by way of atmospheric outlets 193 which may be similar to the nipple construction illustrated in FIGS. 4A and 4B. Upon the floating head portion 202 hitting the cylinder head adjacent the inlet port 192, motion of the floating head portion is arrested causing expansion of the seal 210 against the interior of the barrel 130 into the position illustrated in FIG. 5B. Simultaneously, the projection 206A unseats the ball check 146 permitting air to enter into the port 192 and commence driving the intensifier piston 200 to the right or towards the second position. (See FIG. 5C) As the tail end 201 moves into the second chamber 180, ball check 182 closes due to the increase in pressure in the second chamber over the pressure in the fluid reservoir in communication with the passageway or path 160.

As the fluid intensifier piston 200 moves from its first position to its second position, a fluid dump assist means is provided so that upon the piston approaching its exhaust position its motion is accelerated to that position, so that the gas pressure on the head end of the piston may be relieved to permit the intensifier piston to return from its ssecond back to its first position. To this end, and referring to FIGS. 5A – 5D, the secondary relief means or hydraulic dump assist means includes a cylindrical sleeve or cap member 220 which includes radially extending cylindrical portion 221 with suitable seals 222 and 223 for rubbing engagement with the interior wall 181 of the second chamber 180. Apertures 224 in the side wall of the cap member 220 permit fluid communication from the interior of the sleeve 220 to the second chamber 180, it being noted that the diameter of the tail portion 210 is less than the internal diameter of the cap 220 so as to permit ease of fluid egress and ingress to and from the cap 220 and second chamber 180. Thus as the tail end 201 of the intensifier piston 200 moves to the right, fluid pressure is built up in the second chamber 180 without restriction due to the cap 220, nor developing thrust upon it, thereby increasing the pressure in the first chamber against the slave piston. As the tail end 201 moves to the right, it strikes the bottom 220A of the cap 220 moving the cap to the right against the pressure of a biasing spring 225 which tends to keep the enlarged portion 221 of the cap 220 against the shoulder 183 at the base of the chamber 180. Upon the tail end 201 strking the cap 220, the cap is unseated from the position illustrated in FIG. 5C and the enlarged portion 221 accordingly moves away from the end wall 183 of the chamber 180 causing the unsealing of a hydraulic dump opening 226 which leads back to the fluid reservoir. Simultaneously therewith, as the port 226 is uncovered, the seal 210 is just at the point 230 of a beveled or outwardly flared wall portion 231 in the chamber 190 allowing air to bleed past the O-ring 210, permitting the O-ring or seal 210 to collapse thereby causing separation of the floating head portion 202 and allowing air to escape out the discharge ports 193. Simultaneously, the inlet check or restrictor valve 146 is seated inhibiting air flow from entry to the third chamber 190. The check ball 182 is then opened while check ball 182' is closed due to the drop in pressure in the second chamber 180 allowing reservoir pressure to be communicated to the second chamber 180 and, along with the pressure of the spring 225 causing the intensifier piston to move to the left from the second position to the first position and the cycle starts anew.

Figure 6A:
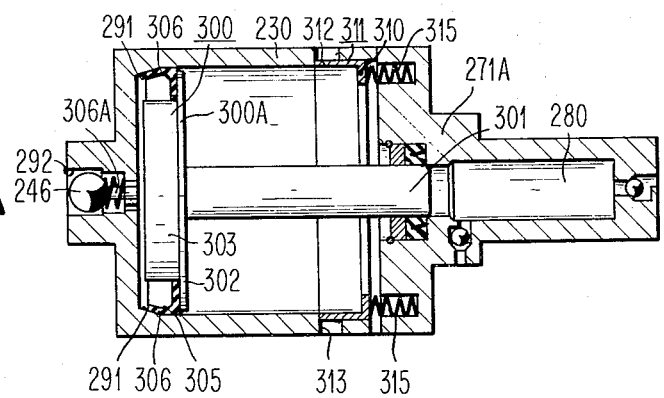
FIG. 6A – 6D illustrates still another embodiment of the present invention in varying stages of work to provide an intensification of hydraulic pressure.
Figure 6B:
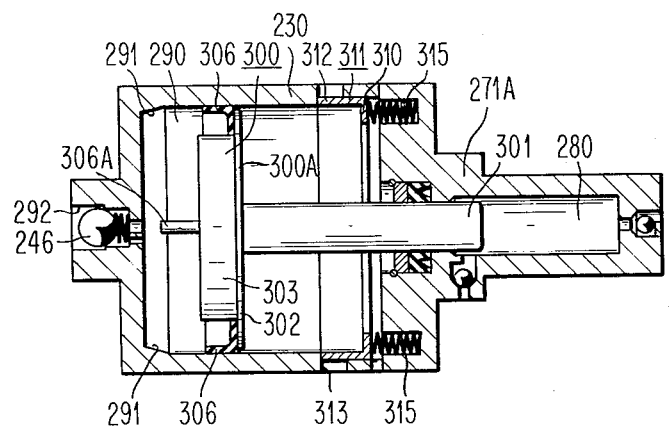
Figure 6C:
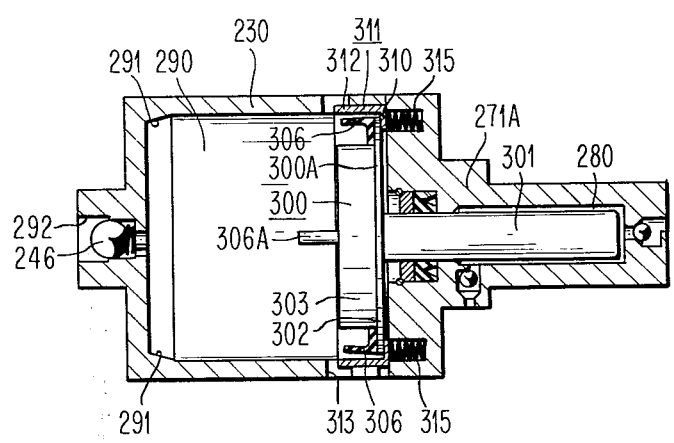
Figure 6D:
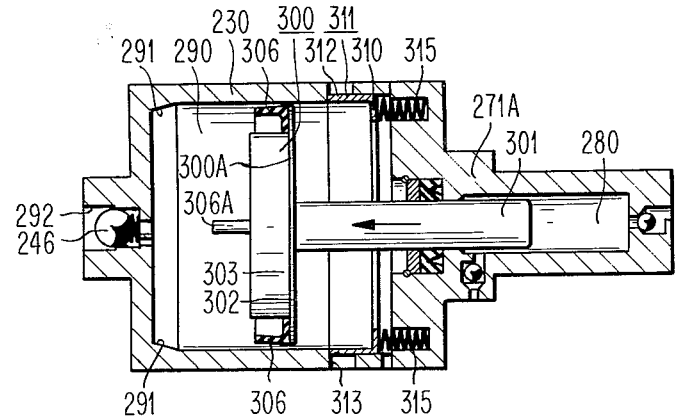

In still another embodiment of the invention, as shown in FIGS. 6A – 6D, the intensifier portion is similar to that shown in FIGS. 5A– 5D and must be employed with a similar hydraulic dump. For purposes of illustration, however, no hydraulic dump is illustrated to simplify the drawing. In this embodiment the barrel 230 has a forward or lefthand portion which is constructed identically to that employed in FIGS. 5A – 5D, that is it includes a beveled forward end wall 291 and an inlet check means 246 mounted in an inlet air bore or passageway 292. The intensifier piston 300 is shaped similar to a hat, the head end 300A including a brim or disk portion 302 and an axially extending but diametrically smaller portion 303. Surrounding the cylindrical portion 303 is an expansible seal 305 including a thin, axially projecting cylindrical wall portion 306. As shown in FIG. 6A, the wall 306 of the seal 305 is caused, by the beveled wall 291 to engage the beveled wall, the piston including a projection 306A which effects unseating of the ball check 246 allowing air to enter into communication with the head end 300A of the intensifier piston 300, effecting movement of the intensifier piston from its first position (shown in FIG. 6A) to its second position as shown in FIG. 6C. As before, the tail end 301 of the intensifier piston is mounted for reciprocation in the second chamber 280. Due to air pressure on the head end 300A of the piston, the seal 305 and especially the wall 306 thereof expands against the interior of the barrel 230 effecting a tight seal and maintaining pressure in the third chamber 290.

As the piston 300 moves towards its second position, relief means are provided to effect a decreasse of gas pressure upon the heaad end whereby the piston moves from the second position back to the first position. To this end, as the piston moves to the right, it engages an inturned lip 310 of a sleeve 311, the sleeve having a depending skirt portion 312 mounted for reciprocation in a recess in the interior of the chamber 290, the skirt portion 312 closing off a port 313 connected to the atmosphere and similar to the port 193 in FIG. 5 and 93 in FIG. 4. The sleeve 311 is biased into the closed position closing off the port 313 by biasing springs 315 captured in the extension 271A of the cylinder head. As the sleeve 311 is moved to the right air is permitted to flow past the wall 306 of the seal 305 out the exhaust port 313 and, the check ball 246, due to the sudden drop in pressure from the air inlet to the chamber 290, closes off and the wall 306 moves inwardly to its relaxed position, permitting reciprocation, due to reservoir pressure in the second chamber 280 to effect leftward movement of the piston 300 from its second position to its first position for resumption of the cycle and further pressure intensification.

Thus the fluid pressure amplifier of the present invention intensifies hydraulic or fluid pressure automatically permitting the pressure to build up to accomplish the desired wrok result, the building up of pressure being automatic and allowing of complete control by the operator as long as air is permitted to enter the air inlet.

Although the invention has been described with a certain degree of particularity, it is understood that the present disclosure has been made only by way of examppple and that numerous changes in the details of construction and the combination and arrangement of parts and the mode of operation may be made without departing from the spirit and the scope of the invention hereinafter claimed.

What is claimed is:

1. A fluid pressure amplifier for intensifying fluid pressure, said amplifier comprising: a housing including a gas-hydraulic interface piston; a first chamber having a slave piston mounted for reciprocation therein, a hydraulic fluid path intermediate said interface piston and said first chamber; a second chamber in said path intermediate said first chamber and said interface piston and check means in said path intermediate said second chamber and said first chamber; a third chamber, and a fluid intensifier piston having a head end and aa tail end, said head end being mounted for reciprocation in said third chamber and said tail end being mounted for reciprocation in said second chamber, said head end having a larger diameter than said tail end and being exposed to gas presssure and said tail end being exposed to hydraulic presssure in said second chamber; a gas inlet to said head end and said interface piston, said fluid intensifier piston movable from a first position to a second position by gas pressure on said head end to thereby increase hydraulic pressure in said first chamber; a relief means to effect a decrease of gas pressure upon said head end at least when said fluid intensifier piston reaches said second position whereby said piston moves from said second to said first position.

2. A fluid amplifier in accordance with claim 1 including check means intermediate said interface piston and said secnd chamber and operative to permit fluid pressure communication therebetween at least when said intensifier piston is moving from said second to said first position.

3. A fluid amplifier in accordance with calim 1 including means to deactivate said relief means at least upon said intensifier piston reaching said first position.

4. A fluid amplifier in accordance with claim 1 including a fluid by-pass path intermediate said first chamber and said interface piston, and means to inhibit fluid pressure communication from said interface piston to said first chamber when gas pressure is applied to said interface piston.

5. A fluid amplifier in accordance with claim 4 wherein said fluid pressure inhibiting means comprises check means in said by-pass path.

6. A fluid amplifier in accordance with claim 5 including a hat piston in said by-pass path abutting said check means, said hat piston having a first face in said by-pass path exposed to hydraulic pressure from said interface pistotn and a second face exposed to a second gas pressure inlet, said second gas pressure inlet being inactive when said first gas inlet is active and viceversa.

7. A fluid amplifier in accordance with claim 6 including a valve assembly having a pressurized gas inlet means, and means in said valve assembly to selectively couple said first and second gas inlets to said pressurized gas inlet means.

8. A fluid amplifier in accordance with claim 1 including valve means in fluid communication with said gas inlet, and operative between a first position coupling a source of gas pressure to said gas inlet and a second position decoupling said source from said gas inlet.

9. A fluid amplifier in accordance with claim 8 including means coupling said source of said gas pressure to said slave piston to effect motion of said slave piston in a direction opposite to the direction imposed when said valve means is in said first position.

10. A fluid amplifier in accordance with claim 1 including check means intermediate said third chamber and said gas inlet, and biasing means for permitting gas to flow from said gas inlet to said third chamber when said fluid intensifier piston is moving between its first position and said second position; said check means restricting gas flow from said gas inlet to said third chamber upon movement of said intensifier piston from said second to said first position.

11. A fluid amplifier in accordance with claim 10 including means carried by said intensifier piston to open said check means at least upon said intensifier piston completing its movement from said second to said first position.

12. A fluid amplifier in accordance with claim 10 including a fourth chamber intermediate said third chamber and said gas inlet, and wherein said check means is positioned intermediate said third and fourth chamber and said gas inlet.

13. A fluid amplifier in accordance with claim 1 wherein said relief means comprises a shaft mounted for reciprocation in and extending through said intensifier piston; said head end of said intensifier piston having a first face exposed to said gas inlet and a second face exposed to atmospheric pressure; a passsageway extending from at least said first face of said piston to said second face of said piston, valve means carried by said shaft operative to seal said passageway as said intensifier piston moves from its first position to its second position; and means, at least upon said intensifier piston reaching said second position to open said valve means and unseal said passageway.

14. A fluid amplifier in accordance with claim 13 wherein said valve means comprises a flexible seal.

15. A fluid amplifier in accordance with claim 13 including check means intermediate said third chamber and said gas inlet, biasing means for holding said check means open as said intensifier piston moves from said first to said ssecond position, but insufficient to hold said check means open upon said intensifier piston reaching said second position.

16. A fluid amplifier in accordance with claim 15 including means carried by said intensifier piston for opening said check means at least upon said intensifier piston moving from its second position to its first position.

17. A fluid amplifier in accordance with claim 13 including means to close said valve means upon said intensifier piston moving at least to said first position.

18. A fluid amplifier in accordance with claim 1 wherein said relief means is carried by the head end of said intensifier piston and includes a radially expansible circumferentially extending seal, and means to effect radial expansion of said seal in sealing engagement in said third chamber upon said intensifier piston moving from said second to said first position.

19. A fluid amplifier in accordance with claim 18 including means for disengaging said seal from its sealing engagement in said third chamber when said piston reaches a predetermined position in its movement from said first position to said second position, thereby permitting gas pressure to bypass said head end of said piston.

20. A fluid amplifier in accordance with claim 19 wherein said seal includes a peripheral, axially extending, flexible wall portion.

21. A fluid amplifier in accordance with claim 19 including a secondary relief means, said secondary relief means comprising a valve means in said second chamber; outlet means providing fluid communication between said second chamber and said interface piston; said valve means inhibiting such communication through said outlet means, said tail end of said intensifier piston operative to engage said valve means and permit fluid communication from said second chamber through said outlet means to said intensifier piston.

22. A fluid amplifier in accordance with claim 19 wherein said head end of said intensifier piston includes a first portion fixed to said tail end; and a second portion including a floating portion mounted for limited axial reciprocation with respect to said first portion, said seal being positioned intermediate said first and second portion, and means carried by one of said portions for camming said seal radially outward to effect said sealing engagement.

23. A fluid amplifier in accordance with claim 22 wherein said camming means comprises a circumferentially extending surface on one of said portions for underlying said seal.

24. A fluid amplifier in accordance with claim 1 wherein said intensifier piston includes a duplex head end, comprising a first portion fixed to said tail end, and a second portion including a floating head portion mounted for limited axial reciprocation with respect to said first portion; and a radially expansible seal intermediate said first portion and said floating head portion and mounted for sealing engagement in said third chamber as said intensifier piston moves from said first to said second position; and means carried by one of said first and second portions to effect radial expansion of said seal by axial movement of said second portion with respect to said first portion upon said head end moving from said second to said first position.

25. A fluid amplifier in accordance with claim 24 including means for disengaging said seal wen said piston reaches a predetermined point in its movement from said first to said second position.

26. A fluid amplifier in accordance with claim 25 including a secondary relief means, said secondary relief means comprising a valve means in said second chamber; outlet means providing fluid communication between said second chamber and said interface piston; said valve means inhibiting such communication through said outlet means, said tail end of said intensifier piston operative to engage said valve means and permit fluid communication from said second chamber through said outlet means to said interface piston.

27. A pressure amplifier comprising in combination, a cylinder having a reciprocating slave piston therein, a cylinder head fixed in said cylinder, and forming a first chamber between said slave piston and said cylinder head, said slave piston being movable between a first position adjacent said cylinder head and a second position remote from said cylinder head; aa hydraulic fluid reservoir, and connecting means forming a hydraulic fluid path coupling said cylinder to said reservoir; an air-hydraulic interface piston means in said reservoir having a first face for contact with and for pressurizing fluid therein; an air inlet, and valve means coupling said air inlet to a second face of said interface piston; a reciprocating fluid intensifier piston, said piston having a first diameter portion exposed to said air inlet and a second diameter portion for interrupting said hydraulic fluid path intermediate said hydraulic fluid reservoir and said slave piston, said first idameter being greater than said second diameter; said intensifier piston being reciprocable between said air inlet and said cylinder head to increase pressure in said first chamber; and check means cooperating with said intensifier piston to inhibit flow of hydraulic fluid from said reservoir to said first chamber as said intensifier piston moves from said first to said second position, and relief means, at least upon said piston reaching said second position, to relieve said air pressure on said first diameter and effect movement of said piston from said second position to said first position at least by hydraulic pressure from said reservoir, through said check means against said second diameter.

28. A pressure amplifier in accordance with claim 27, including check means in said cylinder head to permit hydraulic fluid pressure communication from said hydraulic fluid path to said first chamber, but to inhibit such flow from said first chamber to said hydraulic fluid path.

29. A pressure amplifier in accordance with claim 28 including a fluid by-pass intermediate said first chamber and said interface piston, and means to inhibit fluid pressure communication from said interface piston to said first chamber when gas pressure is applied to said interface piston.

30. A pressure amplifier in accordance with claim 27 wherein said valve means is operative between a first position coupling said air inlet to a second face of said interface piston and said intensifier piston, and a second position coupling said air inlet to conduit means, said conduit means extending between said valve assembly and said slave piston to thereby cause said slave piston to move in a direction opposite to the direction imposed when said valve means is in said first position.

31. A pressurue amplifier in accordance with claim 28 wherein said relief means is carried by the first diameter portion of said intensifier piston and includes a radially expansible circumferentially extending seal, a third chamber in which said first portion reciprocates, and means to effect radial expansion of said seal in sealing engagement in said third chamber when said intensifier piston moves from its first position to said second position; and means to disengage said seal from said sealing engagement at least upon said intensifier piston reaching said second position, thereby permitting air to bypass said first portion of said intensifier piston.

32. A pressure amplifier in accordance with claim 31 wherein said seal includes a peripheral, axially extending, flexible wall portion.

33. A pressure amplifier in accordance with claim 31 wherein said second diameter portion of said intensifier piston is mounted for reciprocation in a second chamber, said second chamber being in said hydraulic fluid path intermediate said reservoir and said cylinder head.

34. A pressure amplifier in accordance with claim 33 including secondary relief means, said secondary relief means comprising a second valve means in said second chamber; outlet means providing fluid communication between said second chamber and said reservoir; said second valve means movable between a first position inhibiting fluid communication through said outlet means and a second position allowing such communication; said second portion of said intensifier piston being operative to engage said second valve means and move said second valve means from its first to its second position.

35. A pressure amplifier in accordance with claim 34 including means to bias said second valve means into said first position.

36. A pressure amplifier in accordance with claim 31 wherein said first diameter portion of said intensifier piston includes a first portion fixed to said second diameter portion; and a second portion including a floating portion mounted for limited axial reciprocation with respect to said first portion, said seal being positioned intermediate said first and second portion, and means carried by one of said portions for camming said seal radially outward to effect said sealing engagement.

37. A pressure amplifier in accordance with claim 36 wherein said camming means comprises a circumferentially extending surface on one of said portions for underlying said seal.

38. A pressure amplifier in accordance with claim 27 wherein said relief means comprises a shaft mounted for reciprocation in said intensifier piston; said first diameter portion of said intensifier piston having a first face exposed to said gas inlet and a second face exposed to atmospheric pressure; a passageway extending from at least said first face of said piston to said second face; valve means carried by said shaft and operative to seal said passageway as said intensifier piston moves from its first position to its second position; and means, at least upon said intensifier piston reaching said second position, to open said valve means and unseal said passageway.

39. A pressure amplifier in accordance with claim 38 wherein said valve means comprises a flexible, cuplike seal.

* * * * *